US012072921B2

(12) United States Patent
LaBute et al.

(10) Patent No.: US 12,072,921 B2
(45) Date of Patent: *Aug. 27, 2024

(54) RESOURCE SELECTION DETERMINATION USING NATURAL LANGUAGE PROCESSING BASED TIERED CLUSTERING

(71) Applicant: Workday, Inc., Pleasanton, CA (US)

(72) Inventors: Montiago Xavier LaBute, Oakley, CA (US); Shane Clifford, Castleconnell (IE); Arina Bobrova, San Francisco, CA (US); Chris Lee, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,789

(22) Filed: Aug. 8, 2022

(65) Prior Publication Data

US 2023/0021143 A1    Jan. 19, 2023

Related U.S. Application Data

(63) Continuation of application No. 17/353,107, filed on Jun. 21, 2021, now Pat. No. 11,442,976.

(51) Int. Cl.
*G06F 16/35* (2019.01)
*G06F 16/33* (2019.01)
(Continued)

(52) U.S. Cl.
CPC ........ *G06F 16/353* (2019.01); *G06F 16/3347* (2019.01); *G06F 16/338* (2019.01);
(Continued)

(58) Field of Classification Search
CPC ... G06F 16/338; G06F 16/3347; G06F 16/353
See application file for complete search history.

(56) References Cited

U.S. PATENT DOCUMENTS 10,957,433 B2 * 3/2021 Lucas ................ G16H 70/00
2006/0161535 A1 * 7/2006 Holbrook ............ G06Q 40/04
(Continued)

OTHER PUBLICATIONS

Bodrunova, S.S.; Orekhov, A.V.; Blekanov, I.S.; Lyudkevich, N.S.; Tarasov, N.A. "Topic Detection Based on Sentence Embeddings and Agglomerative Clustering with Markov Moment." Future Internet 2020, 12, 144. https://doi.org/10.3390/fi12090144. Aug. 26, 2020.
(Continued)

*Primary Examiner* — Loc Tran
(74) *Attorney, Agent, or Firm* — Van Pelt, Yi & James LLP

(57) ABSTRACT

A system comprises an interface configured to receive an identifier, a processor configured to determine a grouping associated with the identifier, wherein the grouping is determined using a first clustering, wherein the first clustering is based at least in part on a language processing system, determine a sub-grouping of the grouping associated with the identifier, wherein the sub-grouping is determined using a second clustering, determine a final identifier based at least in part on the identifier and the sub-grouping, determine a resource based at least in part on the final identifier, and store the final identifier associated with the resource, and a memory coupled to the processor and configured to provide the processor with instructions.

18 Claims, 12 Drawing Sheets

(51) Int. Cl.
   *G06F 16/338*   (2019.01)
   *G06F 18/22*    (2023.01)
   *G06F 40/20*    (2020.01)
   *G06N 3/04*     (2023.01)

(52) U.S. Cl.
   CPC .............. *G06F 18/22* (2023.01); *G06F 40/20* (2020.01); *G06N 3/04* (2013.01)

(56) References Cited

U.S. PATENT DOCUMENTS

| | | | |
|---|---|---|---|
| 2014/0298341 A1* | 10/2014 | Duftler | G06F 9/46 718/100 |
| 2018/0139227 A1* | 5/2018  | Martin  | H04L 63/1433 |
| 2019/0050875 A1* | 2/2019  | McCord  | G06F 40/242 |
| 2020/0029259 A1  | 1/2020  | Yiu     | |
| 2020/0042920 A1  | 2/2020  | Moorthy | |
| 2021/0240787 A1  | 8/2021  | Miguel  | |
| 2021/0256434 A1  | 8/2021  | Alpana  | |

OTHER PUBLICATIONS

S. Agarwal, N. K. Singh and P. Meel, "Single-Document Summarization Using Sentence Embeddings and K-Means Clustering," 2018 International Conference on Advances in Computing, Communication Control and Networking (ICACCCN), 2018, pp. 162-165, doi: 10.1109/ICACCCN.2018.8748762.

Salima Lamsiyah, Abdelkader El Mahdaouy, Bernard Espinasse, Saïd El Alaoui Ouatik, "An unsupervised method for extractive multi-document summarization based on centroid approach and sentence embeddings", Expert Systems with Applications, vol. 167, Oct. 27, 2020, 114152, ISSN 0957-4174, https://doi.org/10.1016/j.eswa.2020.114152.

* cited by examiner

RESOURCE SELECTION DETERMINATION USING NATURAL LANGUAGE PROCESSING BASED TIERED CLUSTERING

CROSS REFERENCE TO OTHER APPLICATIONS

This application is a continuation of U.S. patent application Ser. No. 17/353,107, now U.S. Pat. No. 11,442,976, entitled RESOURCE SELECTION DETERMINATION USING NATURAL LANGUAGE PROCESSING BASED TIERED CLUSTERING filed Jun. 21, 2021 which is incorporated herein by reference for all purposes.

BACKGROUND OF THE INVENTION

Poorly planned resource selection can be a driver of inefficiency across a large organization. When resources are required, if centralized guidance is not available, resource selection is performed in an ad hoc manner. Ad hoc resource selection can result in resource acquisition from inefficient sources, as well as deaggregation of related identifiers from resources (e.g., related identifiers that are not aggregated with a given resource even though the identifiers optimally should be associated with a given resource instead of associated with a number of resources). Centralized resource acquisition guidance in a large organization can be challenging to manage, as a wide variety of different resources and resource types are required, and resource source efficiency regularly changes.

BRIEF DESCRIPTION OF THE DRAWINGS

Various embodiments of the invention are disclosed in the following detailed description and the accompanying drawings.

DETAILED DESCRIPTION

Figure 1:
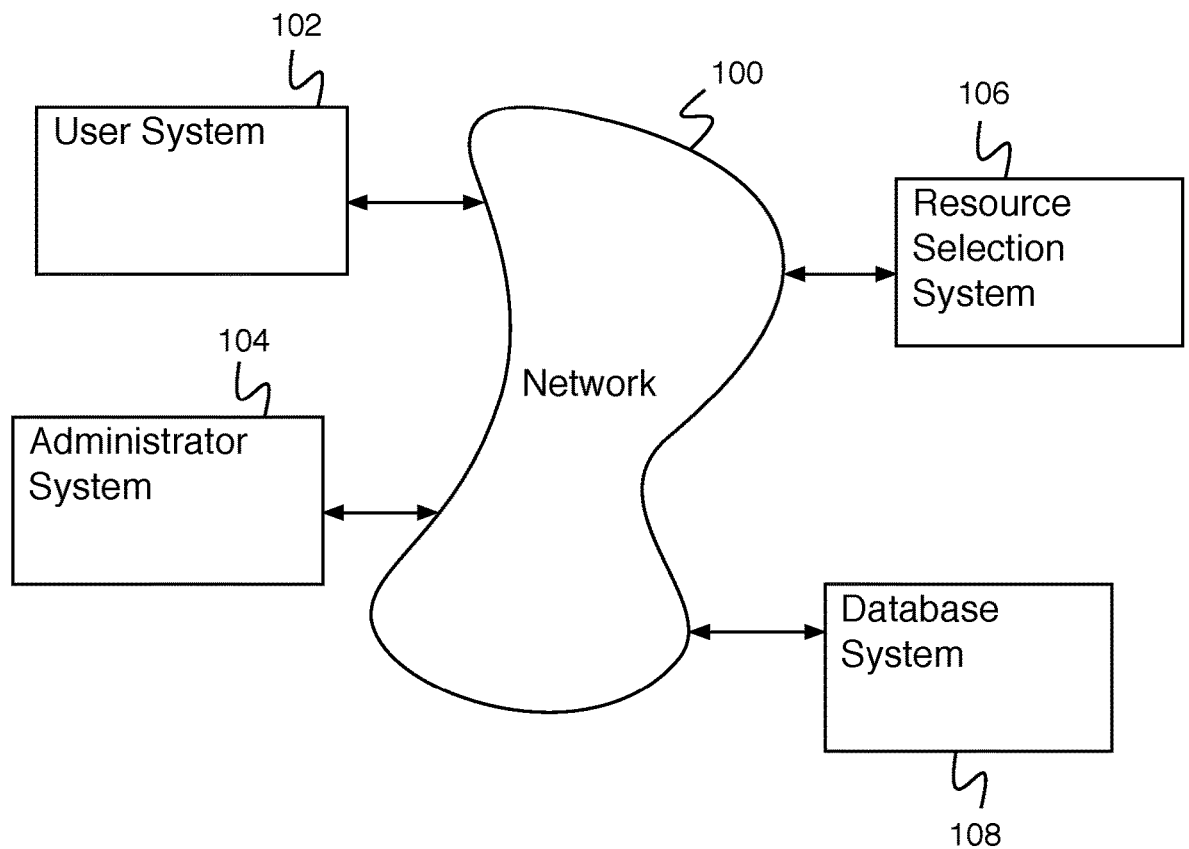
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A system comprises an interface configured to receive an identifier, a processor configured to determine a grouping associated with the identifier, wherein the grouping is determined using a first clustering, wherein the first clustering is based at least in part on a language processing system, determine a sub-grouping of the grouping associated with the identifier, wherein the sub-grouping is determined using a second clustering, determine a final identifier based at least in part on the identifier and the sub-grouping, determine a resource based at least in part on the final identifier, and store the final identifier associated with the resource, and a memory coupled to the processor and configured to provide the processor with instructions.

A system for resource selection determination using natural language processing based tiered clustering is disclosed. The system for resource selection determination using natural language processing based tiered clustering utilizes a first clustering based at least in part on a language processing system. For example, the language processing system comprises a machine learning system, a neural network system, an artificial intelligence system, a transformer, etc. The language processing system is used to preprocess a set of identifiers to determine a set of vectors. A vector associated with an identifier comprises a location in a multidimensional space. The set of vectors is clustered using a clustering algorithm to determine a set of clusters of identifiers. Within each cluster a second level clustering algorithm is used. For example, the second level clustering algorithm is based at least in part on a string edit distance (e.g., a number of character changes necessary to transform a first identifier into a second identifier). In some embodiments, the second level clustering algorithm clusters a set of identifiers wherein any identifier in the set is less than a threshold string edit distance from each other identifier in the set. A representative final identifier is chosen for each cluster determined by the second level clustering algorithm. For example, the final identifier comprises the identifier associated with the least resource usage, a most reliable identifier, a preferred identifier, a random identifier, an identifier of the cluster, an identifier not of the cluster, etc. The final identifier is associated with a resource, for example a resource provision channel.

In response to receiving a received identifier at an interface, the system for resource selection determination processes the received identifier using the language processing system. A cluster of the set of clusters of identifiers associated with the received identifier is determined (e.g., the cluster the received identifier is closest to in the multidimensional space is determined). A second level cluster associated with the received identifier is then determined (e.g., the second level cluster comprising the least average string edit distance to the received identifier is determined). The final identifier and associated resource associated with the determined second level cluster is determined. For example, the final identifier and associated resource are stored, are provided to the requester, the final identifier is provided to the associated resource, etc. In some embodiments, the final identifier is used for analysis and statistics. The system for resource selection determination using natural language processing based tiered clustering improves the computer by automatically determining a preferred identifier from a large identifier catalog associated with a requested identifier, without any manual curation. The determination of the final identifier using the initially requested identifier is for more optimally determining a resource. In some embodiments, the final identifier is used for determination of the associated resource.

FIG. 1 is a block diagram illustrating an embodiment of a network system. In some embodiments, the network system of FIG. 1 comprises a network system for a system for predicting data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, resource selection system 106, and database system 108 communicate via network 100.

User system 102 comprises a user system for use by a user. For example, user system 102 comprises a system for communication, data access, computation, etc. A user uses user system 102 to access database system 108. For example, a user uses user system 102 to access data on database system 108, a user uses user system 102 to add data to database system 108, a user uses user system 102 to modify data on database system 108, a user uses user system 102 to delete data on database system 108, a user uses user system 102 to request data processing on database system 108, etc. Administrator system 104 comprises an administrator system for use by an administrator. For example, administrator system 104 comprises a system for communication, data access, computation, etc. An administrator uses administrator system 104 to maintain database system 108. For example, an administrator uses administrator system 104 to start and/or stop services on database system 108, to reboot database system 108, to install software on database system 108, to add, modify, and/or remove data on database system 108, etc. Database system 108 comprises a database system for storing data. For example, database system 108 comprises a business database system, a human resources database system, a financial database system, a university database system, a medical database system, a manufacturing database system, etc.

Resource selection system 106 comprises a system for resource selection. For example, resource selection system 106 comprises a system for determining a preferred identifier and resource in response to a user query for a desired identifier. Resource selection system 106 implements a many-to-few transformation, going from a large number of desired identifiers to a small number of preferred identifiers and resources. For example, resource selection system 106 comprises an interface configured to receive a user query for an identifier, a processor configured to determine a grouping associated with the identifier, wherein the grouping is determined using a first clustering, wherein the first clustering is based at least in part on a language processing system, determine a sub-grouping of the grouping associated with the identifier, wherein the sub-grouping is determined using a second clustering, determine a final identifier based at least in part on the identifier and the sub-grouping, determine a resource based at least in part on the final identifier, and store the final identifier associated with the resource, and a memory coupled to the processor and configured to provide the processor with instructions.

Figure 2:
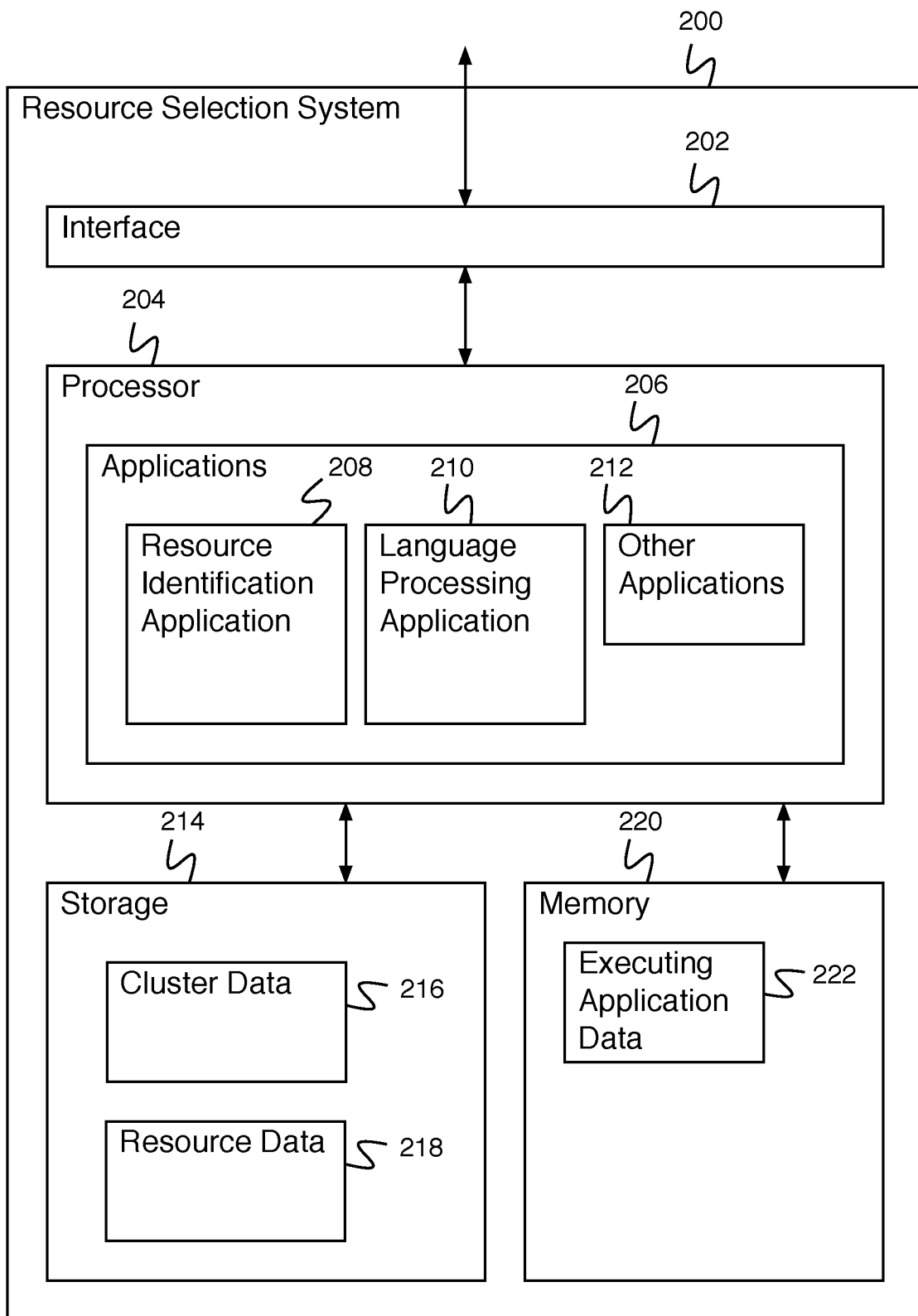
FIG. 2 is a block diagram illustrating an embodiment of a resource selection system.

FIG. 2 is a block diagram illustrating an embodiment of a resource selection system. In some embodiments, resource selection system 200 comprises resource selection system 106 of FIG. 1. In the example shown, resource selection system 200 comprises interface 202. For example, interface 202 comprises an interface for receiving data, providing data, receiving data processing parameters, receiving a request to execute data processing, receiving a user query for an identifier, etc. Processor 204 comprises a processor for executing applications 206. Applications 206 comprise resource identification application 208, language processing application 210, and other applications 212. Resource identification application 208 comprises an application for resource identification, for example, an application for determining a first clustering and a second clustering, for associating a received identifier query with a cluster of a first clustering and a cluster of a second clustering, for determining a final identifier and associated resource, etc. Language processing application 210 comprises an application for processing an identifier query. For example, language processing application 210 comprises an application for determining a vector based at least in part on an identifier. In various embodiments, language processing application 210 comprises a machine learning system, a neural network system, a natural language processing system, a transformer system, or any other appropriate language processing system. For example, applications 206 is configured to determine a grouping associated with an identifier, wherein the grouping is determined using a first clustering, wherein the first clustering is based at least in part on a language processing system, determine a sub-grouping of the grouping associated with the identifier, wherein the sub-grouping is determined using a second clustering, determine a final identifier based at least in part on the identifier and the sub-grouping, determine a resource based at least in part on the final identifier, and store the final identifier associated with the resource. In some embodiments, the final identifier is substituted for the identifier and is used instead of the identifier to determine or selected a resource. In some embodiments, the final identifier is Other applications 212 comprises any other appropriate applications (e.g., a data storage and retrieval application, a communications application, a chat application, a web browser application, a document preparation application, a report preparation application, a user interface application, a data analysis application, etc.). Storage 214 comprises cluster data 216 (e.g., precomputed first clustering data and second clustering data associated with a set of identifiers) and resource data 218 (e.g., resource data and final identifier data associated with one or more clusters of cluster data 216, etc.). Memory 220 comprises executing application data 222 comprising data associated with applications 206.

Figure 3A:
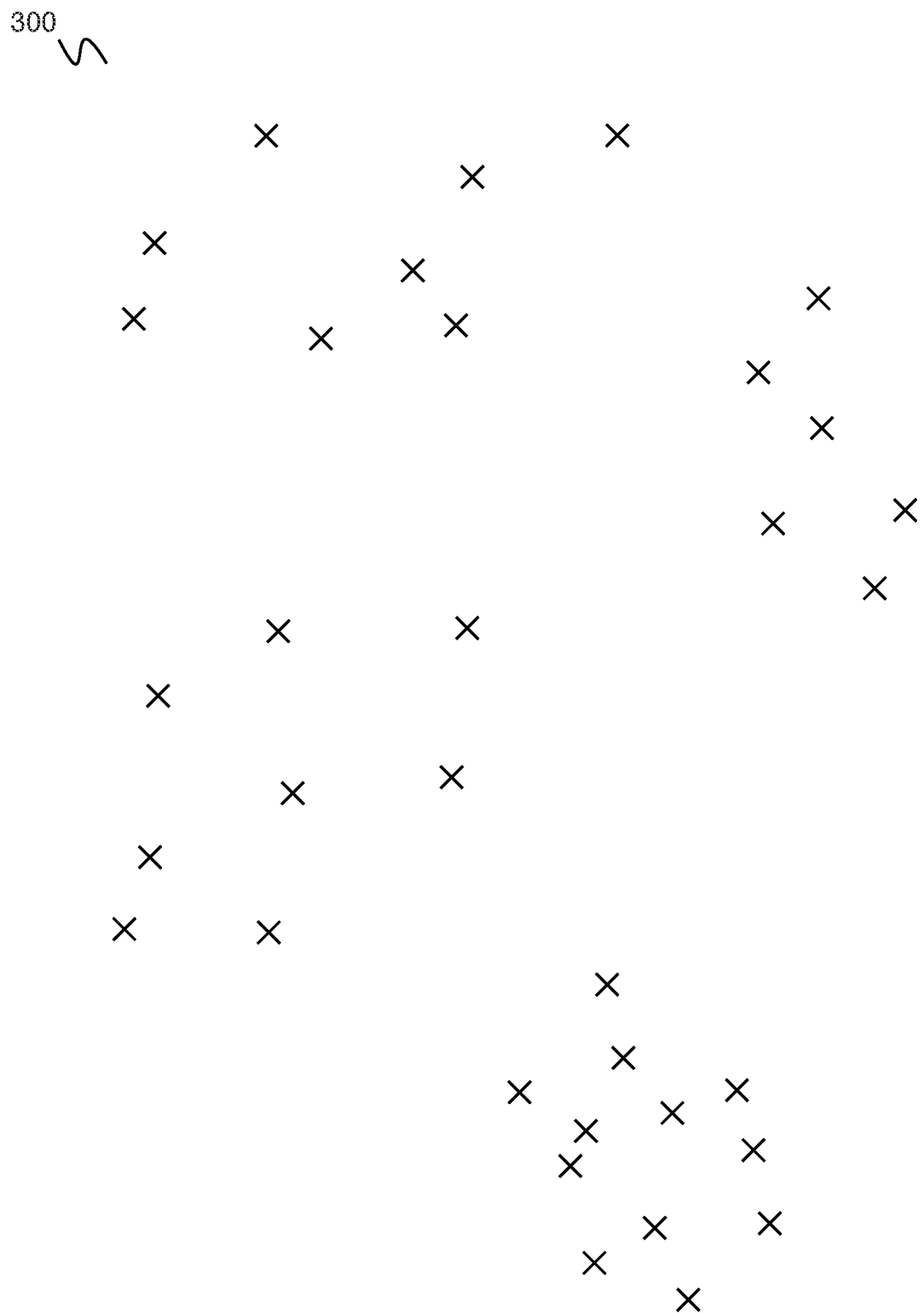
FIG. 3A is a diagram illustrating an embodiment of a set of vectors.

FIG. 3A is a diagram illustrating an embodiment of a set of vectors. In some embodiments, a grouping of a set of vectors comprises a portion of a first clustering process performed by a resource identification application. In the example shown, cross marks 300 comprise vectors (e.g., locations in a multidimensional space). For example, cross marks 300 comprise vector locations determined by processing identifiers using a language processing system (e.g., language processing application 210 of FIG. 2). Identifiers processed by the language processing system comprise a predetermined set of identifiers (e.g., a predetermined set of identifiers stored on a database system).

Figure 3B:
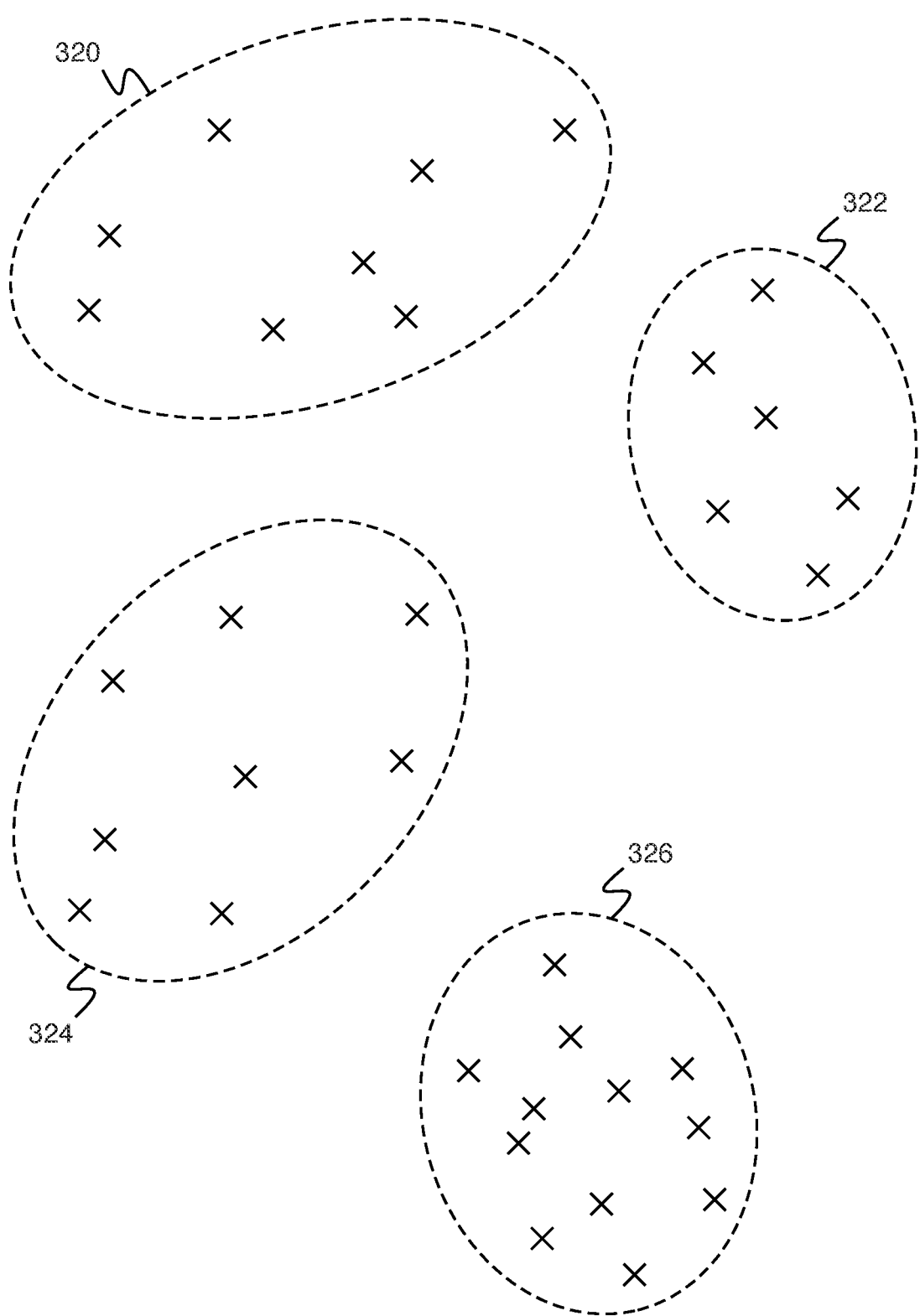
FIG. 3B is a diagram illustrating an embodiment of a clustering of a set of vectors.

FIG. 3B is a diagram illustrating an embodiment of a grouping of a set of vectors. In some embodiments, the grouping of FIG. 3B comprises a clustering of the set of vectors of FIG. 3A. FIG. 3B shows a clustering determined using a clustering algorithm. In various embodiments, the clustering is determined using a k-means algorithm, a density-based spatial clustering algorithm, an agglomerative hierarchical clustering algorithm, an expectation-maximization clustering algorithm, etc. In the example shown, vectors are clustered into four clusters: cluster 320, cluster 322, cluster 324, and cluster 326. In some embodiments, determination of a set of vectors from a set of identifiers and clustering of the set of vectors comprises a pre-processing portion of a resource determination algorithm.

Figure 3C:
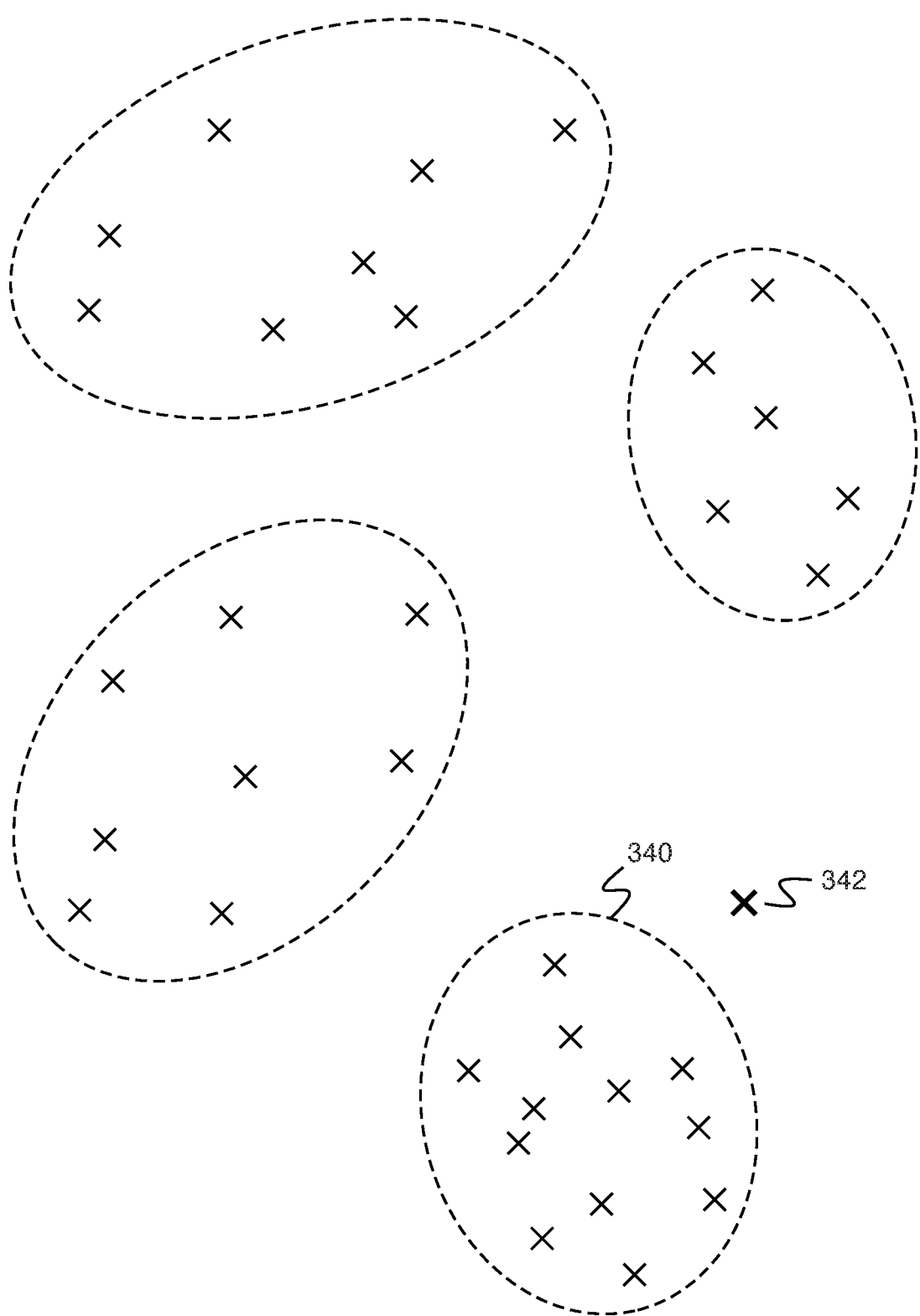
FIG. 3C is a diagram illustrating an embodiment of determining a grouping associated with a received identifier.

FIG. 3C is a diagram illustrating an embodiment of determining a grouping associated with a received identifier. In some embodiments, the grouping utilizes the clustering of FIG. 3B. In the example shown, vector 342 comprises a vector associated with a received identifier query. The grouping process analyzes the distance between vector 342 and the predetermined clusters (e.g., wherein distance comprises distance between vector 342 and the cluster centroid, average distance between vector 342 and the cluster's constituent vectors, the maximum distance between vector 342 and the cluster vectors, distance from vector 342 to the cluster edge, distance from vector 342 to the cluster farthest vector, etc.) to determine the closest cluster of the predetermined clusters. In the example shown, cluster 340 is determined to be the closest cluster and is associated with the received identifier.

Figure 3D:
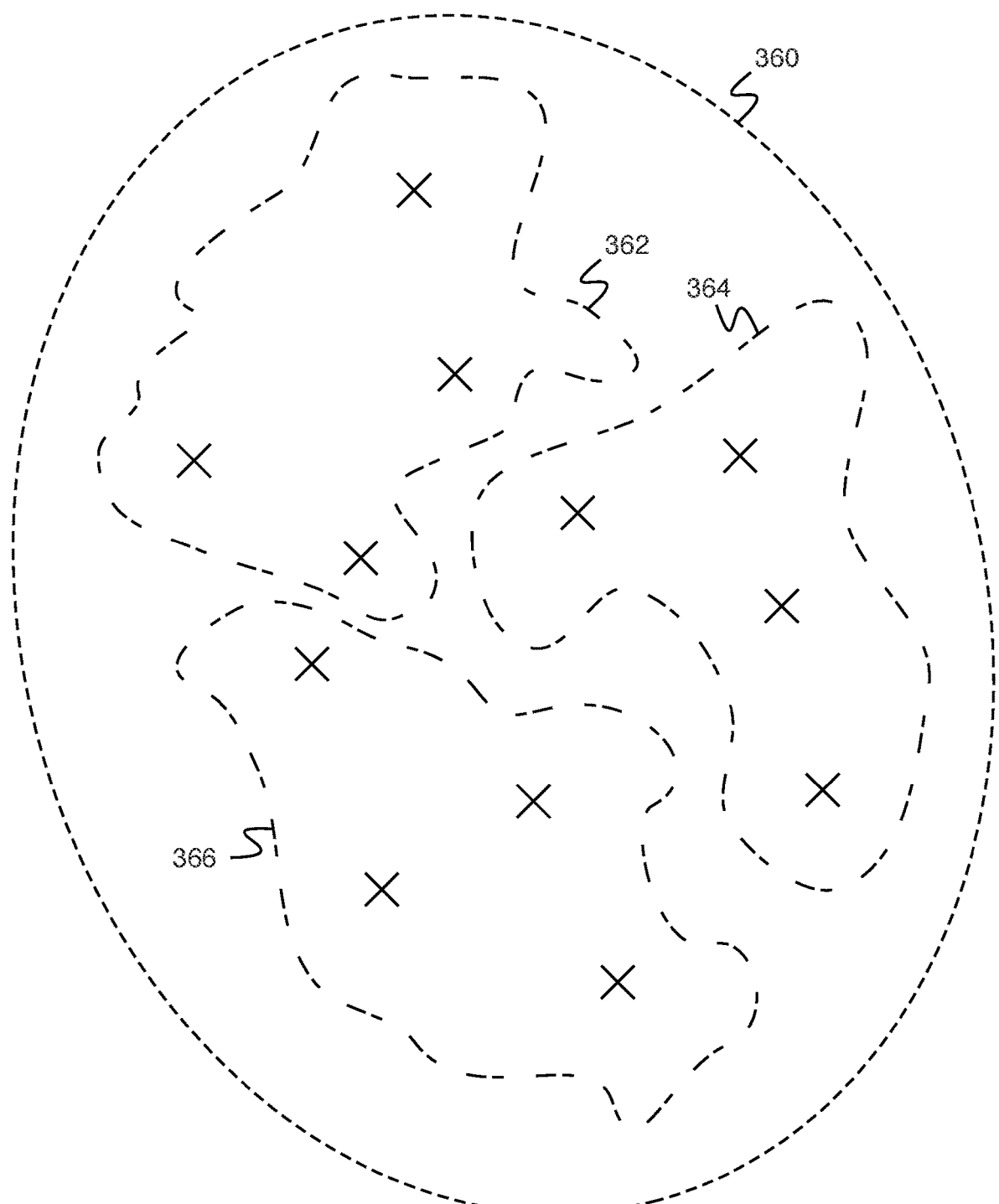
FIG. 3D is a diagram illustrating an embodiment of a sub-grouping.

FIG. 3D is a diagram illustrating an embodiment of a sub-grouping. In some embodiments, the grouping of FIG. 3D comprises a sub-grouping of cluster 326 of FIG. 3B or 340 of FIG. 3C. For example, the sub-grouping of FIG. 3D comprises a sub-grouping of a grouping determined using a clustering algorithm for a set of vectors. In the example shown, cluster 360 is sub-grouped into sub-cluster 362, sub-cluster 364, and sub-cluster 366. The sub-grouping is determined using a second clustering. For example, the second clustering uses string edit distances between identifiers in the grouping to identify the sub-groupings.

Figure 4:
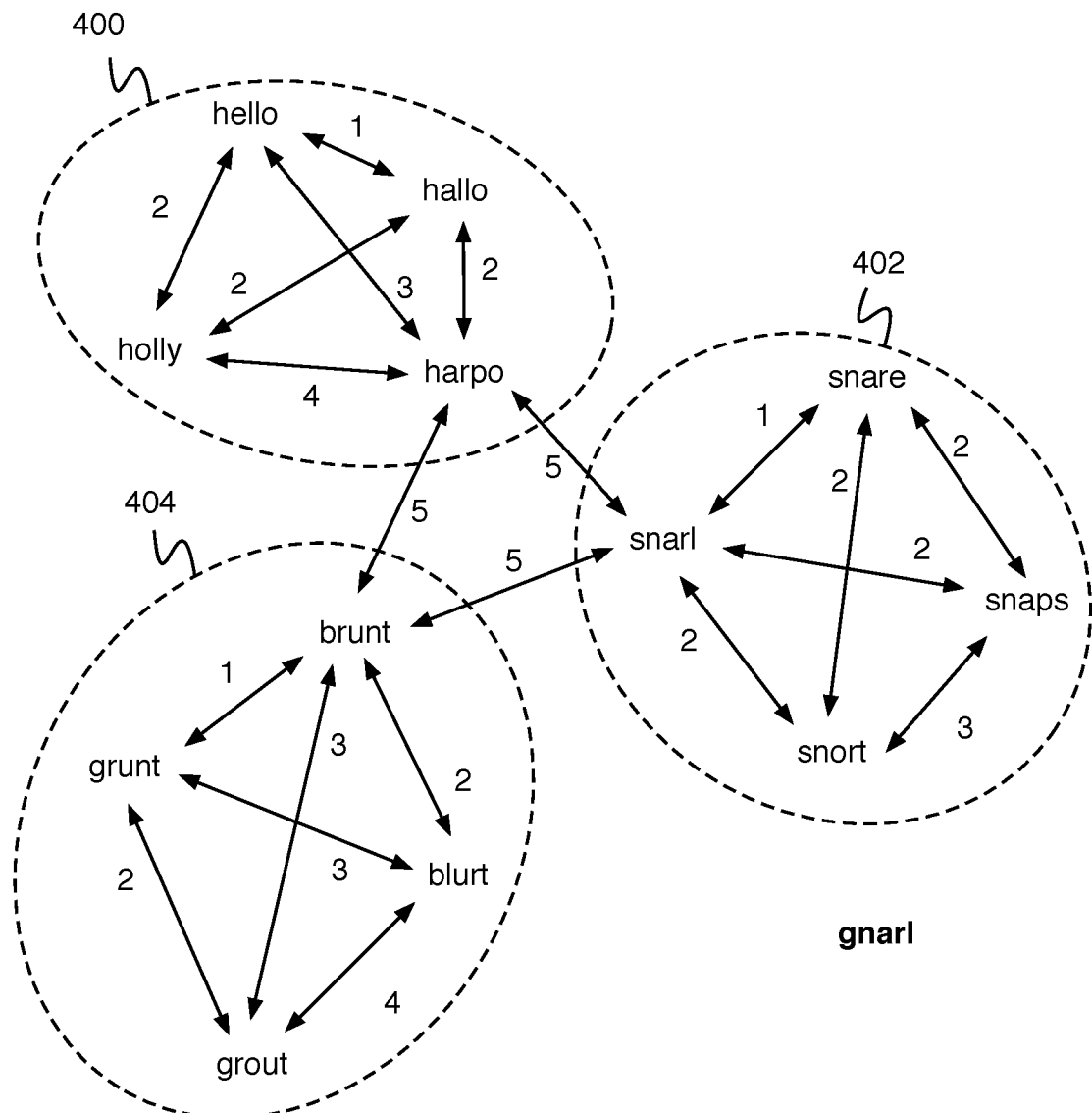
FIG. 4 is a diagram illustrating an embodiment of a grouping by string edit distance.

FIG. 4 is a diagram illustrating an embodiment of a grouping by string edit distance. In some embodiments, a grouping by string edit distance comprises a portion of a second clustering process performed by a resource identification application. In the example shown, a group of words are clustered by string edit distance, wherein all words within a cluster have a string edit distance of four or less to all other words within the cluster. String edit distances within a cluster are shown, as well as string edit distances between representative members of separate clusters. The clustering algorithm produces three clusters, cluster 400, cluster 402, and cluster 404. When word gnarl is added to the collection of words, it can only join cluster 402. Cluster 402 is the only cluster where each word on the cluster has string edit distance of four or less to the word gnarl.

Figure 5:
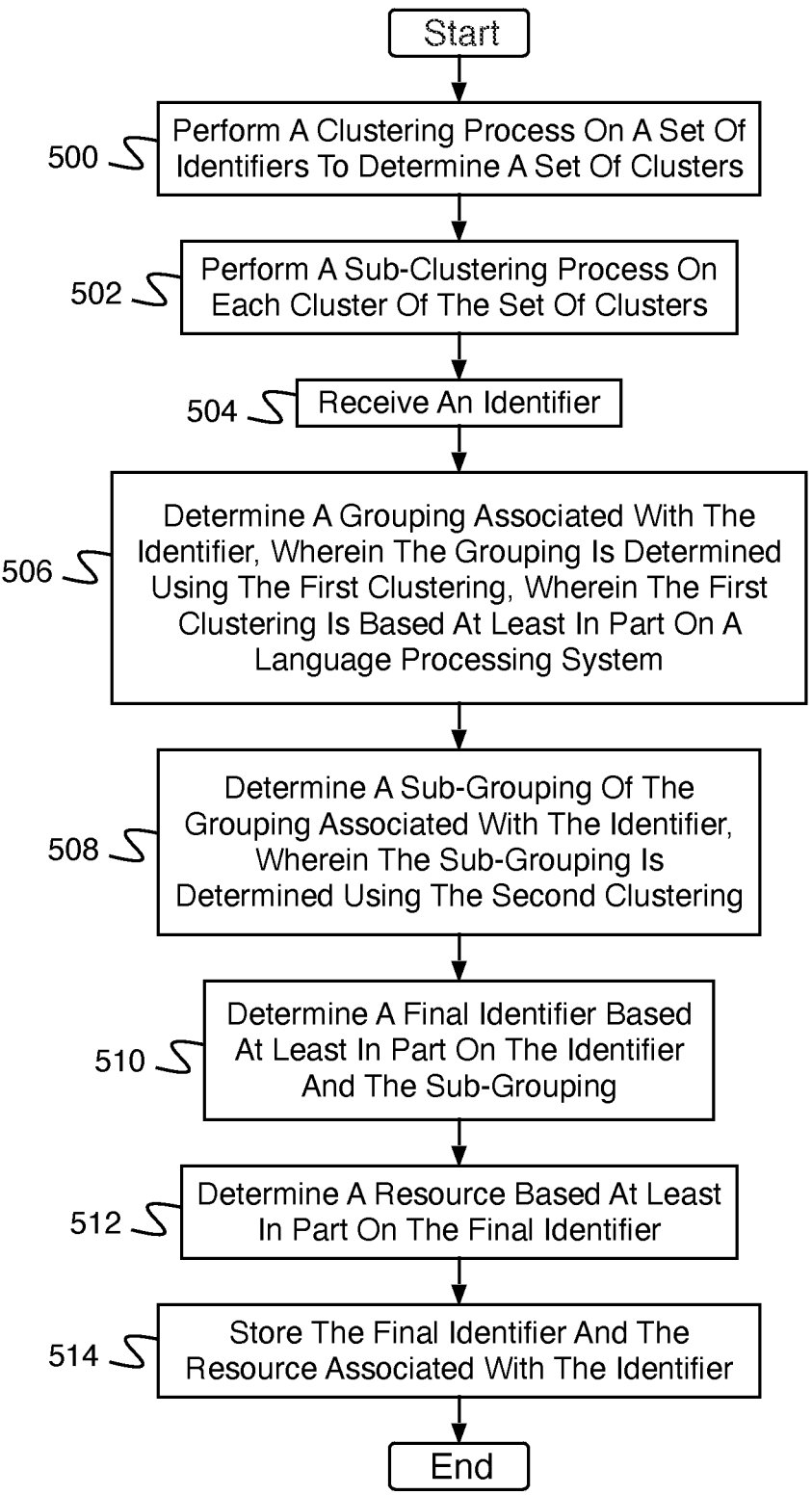
FIG. 5 is a flow diagram illustrating an embodiment of a process for resource selection determination.

FIG. 5 is a flow diagram illustrating an embodiment of a process for resource selection determination. In some embodiments, the process of FIG. 5 is executed by resource selection system 106 of FIG. 1. In the example shown, in 500, a clustering process is performed on a set of identifiers to determine a set of clusters. For example, a clustering process is performed on a stored set of identifiers to determine a preprocessed set of clusters. In various embodiments, pre-processing includes punctuation removal, identifying parts-of-speech, tagging, named entity recognition and then embedding of text into a numerical vector space. In 502, a sub-clustering process is performed on each cluster of the set of clusters. For example, the vectors are then clustered using an unsupervised machine learning method that can generate latent, low-dimensional groupings of high-dimensional data (e.g., k-means clustering, Gaussian mixing models, Bayesian hierarchical clustering etc.). At the end of this process, several groupings, sub-groupings, or embedding clusters are obtained. In some embodiments, the embedding clusters are the output cluster groups determined using the clustering algorithm. Where for each embedding cluster, a record normalization or deduplication algorithm is run that clusters identifiers according to a string edit distance metric. A particular instantiation of this process is doing hierarchical clustering using affine gap distance between identifier strings. In 504, an identifier is received. For example, the identifier indicates something for which an associated resource is desired. In various embodiments, the identifier comprises a hardware item, a device, an equipment item, an electronic device, a component, or any other appropriate item. In 506, a grouping associated with identifier is determined, wherein the grouping is determined using the first clustering, wherein the first clustering is based at least in part on a language processing system. For example, determining the grouping associated with the identifier comprises determining a cluster of the set of clusters associated with the identifier. In 508, a sub-grouping of the grouping associated with the identifier is determined, wherein the sub-grouping is determined using the second clustering. For example, determining a sub-grouping of the grouping comprises determining a sub-cluster of the cluster determined in 506. In some embodiments, a sub-group comprises a portion or smaller grouping of a group. In some embodiments, a sub-cluster comprises a portion or smaller cluster of a cluster. In 510, a final identifier is determined based at least in part on the identifier and the sub-grouping. For example, a final identifier, or an identifier that is used in place of the initial identifier, is identified using an analysis using two levels of clustering (e.g., a clustering and clustering within the first cluster results). A final identifier is determined by finding a cluster and sub-cluster associated with the identifier and then determining, if appropriate, a different identifier associated with the sub-cluster that is better for finding a resource (e.g., a 'canonical' identifier that is associated with the sub-cluster). As an example, each sub-cluster is labeled using a canonical identifier group. In some embodiments, each canonical identifier group is labeled by the maximum common substring across all constituent identifiers in the group (e.g., a longest substring that is the same across the identifiers in the group). In some embodiments, the final identifier is associated with the sub-grouping.

In 512, a resource is determined based at least in part on the final identifier. For example, the resource is determined by optimizing a function, where the function includes metrics useful in determining the resource associated with an identifier. For example, the metrics comprise measures of acquiring a given resource from a given provider of the resource, measures involved in the acquisition of the given resource from the system associated with a requestor of the identifier, measures associated with the acquisition of a number of units, etc. In some embodiments, the determination of the resource is based at least in part on a constraint. In various embodiments, the constraint comprises a constraint on a volume of identifiers or of similar identifiers, a constraint on a number of resources or of type of resources, a constraint on identifier—resource pairings, or any other appropriate constraint. In various embodiments, the optimizing of a function comprises a minimization and a maximization of the function. In some embodiments, the resource is determined based at least in part on a resource timing parameter. In some embodiments, the resource is determined based at least in part on a resource multiplier parameter. In some embodiments, the resource is associated with the final identifier. In 514, the final identifier and the resource are stored associated with the identifier.

In some embodiments, the system processes as follow: 1) recommends to a user the best identifier (i.e., a final identifier) and resource in response to a query from that user; 2) generates the recommendation by embedding the user query in the same vector space as the canonical identifier group embeddings; and 3) finds the most relevant embedding cluster for the query by scoring the embeddings contained within the cluster against the query embedding using some similarity metric. A specific example would be to use the highest average cosine similarity between the query embedding vector and all constituent canonical identifier embedding vectors in the embedding cluster. The canonical identifier groups in the top scoring embedding cluster are rank ordered by other heuristics.

Figure 6:
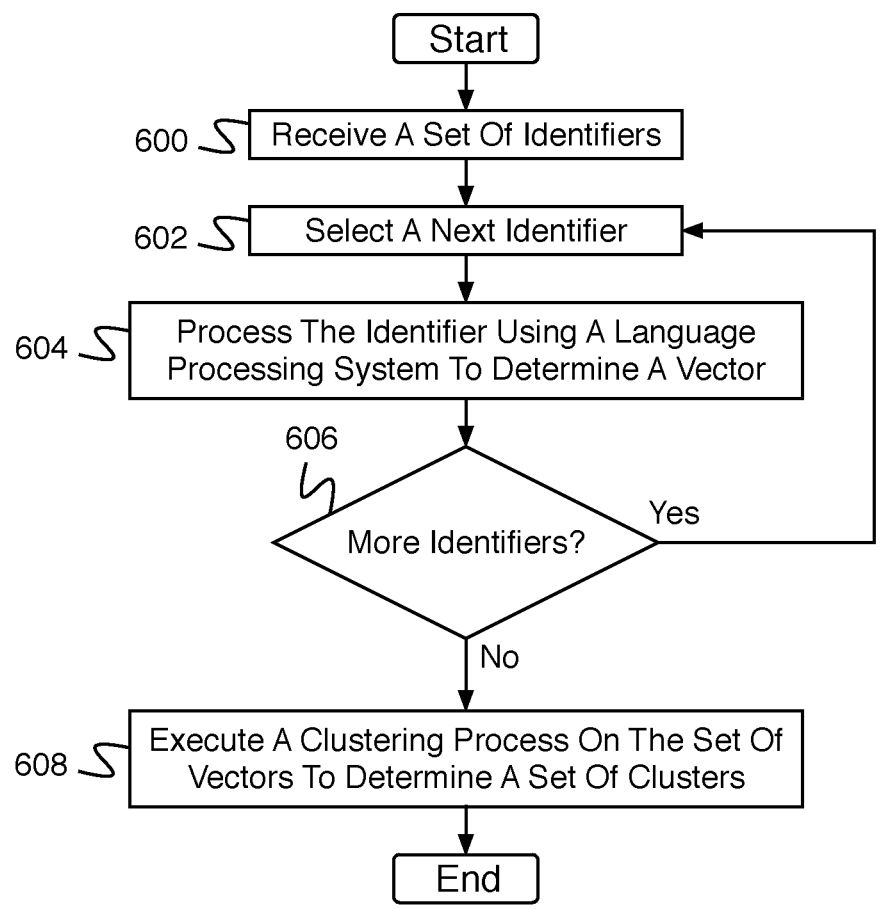
FIG. 6 is a flow diagram illustrating an embodiment of a process for performing a clustering process on a set of identifiers to determine a set of clusters.

FIG. 6 is a flow diagram illustrating an embodiment of a process for performing a clustering process on a set of identifiers to determine a set of clusters. In some embodiments, the process of FIG. 6 implements 500 of FIG. 5. In the example shown, a set of identifiers is received. For example, the set of identifiers comprises a stored set of identifiers, a set of identifiers retrieved from a database, an external set of identifiers accessed for this purpose, or any other appropriate set of identifiers. In 602, a next identifier is selected. In some embodiments, the next identifier comprises the first identifier. In 604, the identifier is processed using a language processing system to determine a vector. In 606, it is determined whether there are more identifiers. In the event it is determined that there are more identifiers, control passes to 602. In the event it is determined that there are not more identifiers, control passes to 608. In 608, a clustering process is executed on the set of vectors to determine a set of clusters.

Figure 7:
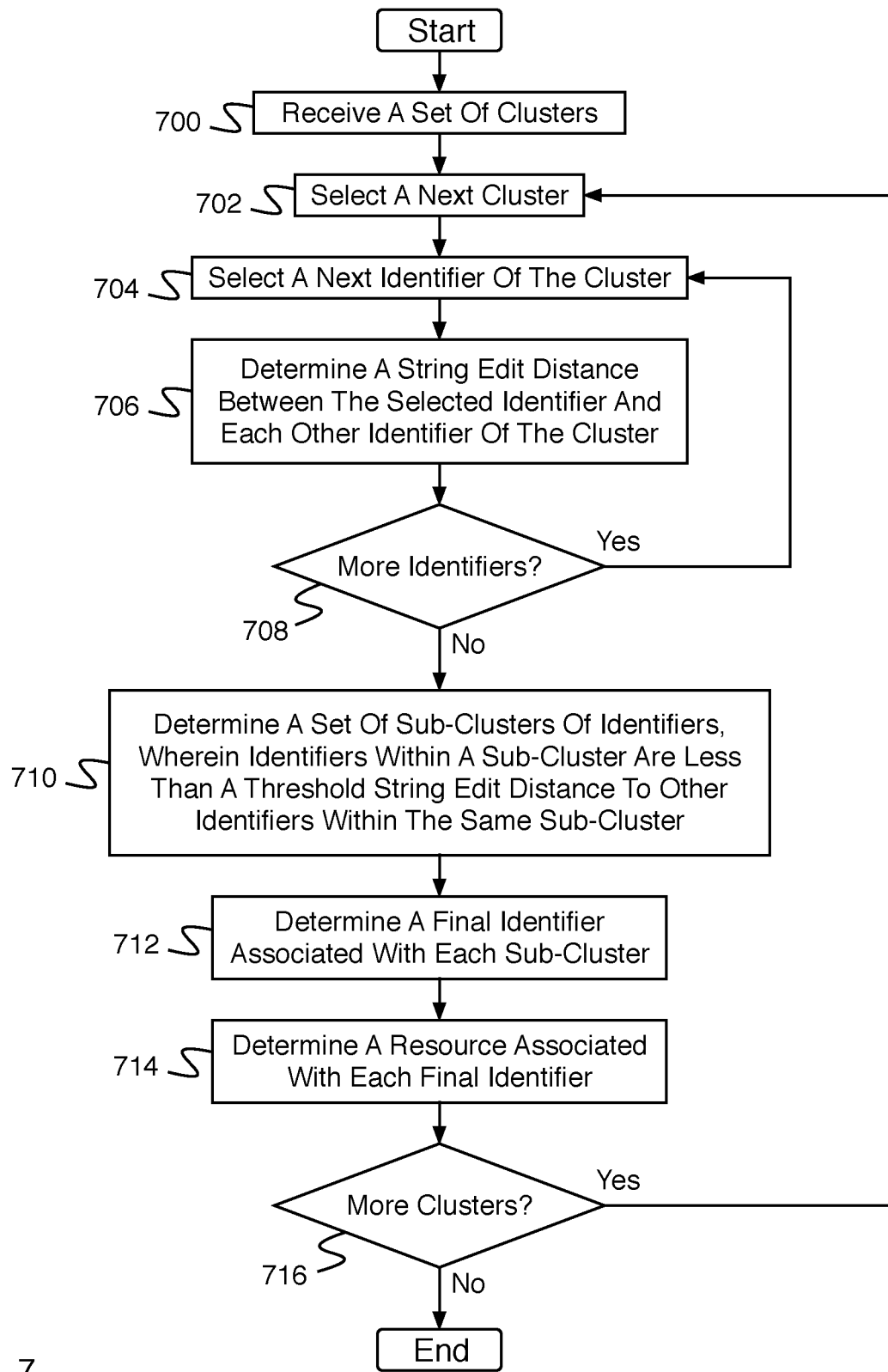
FIG. 7 is a flow diagram illustrating an embodiment of a process for performing a sub-clustering process on each cluster of the set of clusters.

FIG. 7 is a flow diagram illustrating an embodiment of a process for performing a sub-clustering process on each cluster of the set of clusters. In some embodiments, the process of FIG. 7 implements 502 of FIG. 5. In the example shown, in 700, a set of clusters is received. For example, the set of clusters determined using the process of FIG. 6 is received. In 702, a next cluster is selected. In some embodiments, the next cluster comprises the first cluster. In 704, a next identifier is selected. In some embodiments, the next identifier comprises the first identifier. In 706, a string edit distance between the selected identifier and each other identifier of the cluster is determined. In 708, it is determined whether there are more identifiers. In the event it is determined that there are more identifiers, control passes to 704. In the event it is determined that there are not more identifiers, control passes to 710. In 710, a set of sub-clusters of identifiers are determined, wherein identifiers within a sub-cluster are less than a threshold string edit distance to other identifiers within the same sub-cluster. In 712, a final identifier associated with each sub-cluster is determined. In various embodiments, the final identifier associated with a sub-cluster comprises a most recently used identifier of the sub-cluster, a most commonly used identifier of the sub-cluster, a least expensive identifier of the sub-cluster (e.g., the system determines a cost associated with the identifier based at least in part on metrics), a most preferred identifier of the sub-cluster, a random identifier of the sub-cluster, an identifier not of the sub-cluster (e.g., a canonical identifier associated with the sub-cluster but not in the sub-cluster), or any other appropriate identifier. In 714, a resource associated with each final identifier is determined. In various embodiments, the resource associated with a final identifier comprises a most recently used resource associated with the final identifier, a most commonly used resource associated with the final identifier, a least expensive resource associated with the final identifier (e.g., the system determines a cost associated with the resource based at least in part on metrics), a most preferred resource associated with the final identifier, a random resource associated with the final identifier, a resource not previously associated with the final identifier, or any other appropriate resource. In some embodiments, a plurality of resources is determined. For example, when a plurality of resources is determined, a resource of the plurality of resources is selected based at least in part on a resource timing parameter and/or a resource multiplier parameter. In 716, it is determined whether there are more clusters. In the event it is determined that there are more clusters, control passes to 702. In the event it is determined that there are not more clusters, the process ends.

Figure 8:
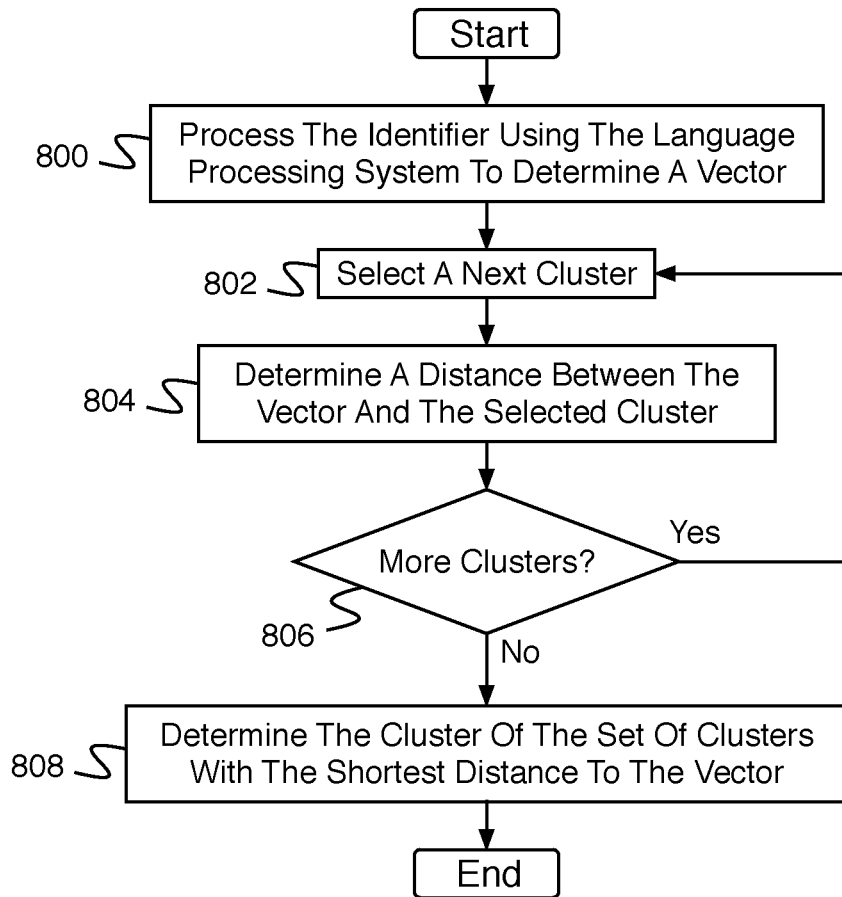
FIG. 8 is a flow diagram illustrating an embodiment of a process for determining a grouping associated with an identifier.

FIG. 8 is a flow diagram illustrating an embodiment of a process for determining a grouping associated with an identifier. In some embodiments, the process of FIG. 8 implements 506 of FIG. 5. In the example shown, in 800, the identifier is processed using the language processing system to determine a vector. In 802, a next cluster is selected. In some embodiments, the next cluster comprises the first cluster. In 804, a distance between the vector and the selected cluster is determined. In various embodiments, the distance comprises the minimum distance between the vector and a cluster member, the maximum distance between the vector and a cluster member, the distance between the vector and the cluster centroid, the minimum distance between the vector and a cluster edge, the maximum distance between the vector and a cluster edge, or any other appropriate distance. In 806, it is determined whether there are more clusters. In the event it is determined that there are more clusters, control passes to 802. In the event it is determined that there are not more clusters, control passes to 808. In 808, the cluster of the set of clusters with the shortest distance to the vector is determined.

Figure 9:
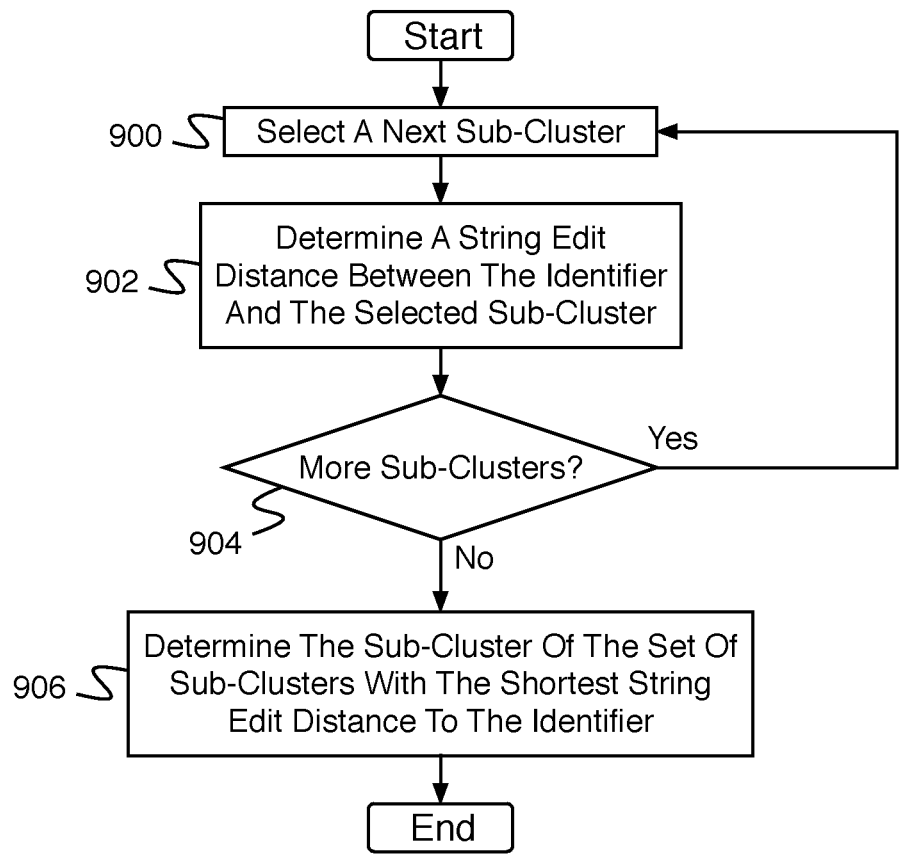
FIG. 9 is a flow diagram illustrating an embodiment of a process for determining a sub-grouping of a grouping associated with an identifier.

FIG. 9 is a flow diagram illustrating an embodiment of a process for determining a sub-grouping of a grouping associated with an identifier. In some embodiments, the process of FIG. 9 implements 508 of FIG. 5. In the example shown, in 900, a next sub-cluster is selected. In some embodiments, the next sub-cluster comprises the first sub-cluster. In 902, a string edit distance between the identifier and the selected sub-cluster is determined. In various embodiments, the string edit distance between the identifier and the selected sub-cluster comprises an average string edit distance between the identifier and the members of the sub-cluster, a maximum string edit distance between the identifier and the members of the sub-cluster, a minimum string edit distance between the identifier and the members of the sub-cluster, a string edit distance between the identifier and a random member of the sub-cluster, a string edit distance between the identifier and a representative member of the sub-cluster, or any other appropriate string edit distance. In 904, it is determined whether there are more sub-clusters. In the event it is determined that there are more sub-clusters, control passes to 900. In the event it is determined that there are not more sub-clusters, control passes to 906. In 906, the sub-cluster of the set of sub-clusters with the shortest string edit distance to the identifier is determined.

In some embodiments, the system receives an identifier (e.g., a hardware identifier such as a Dell Laptop with a core i5 processor). The system determines that the identifier is associated with a group using a first clustering (e.g., a portable computation device group or a laptop group). The system determines a sub-grouping of the grouping associated with the identifier using a second clustering (e.g., a PC laptop group or PC laptop with i5 processors). The system determines a final identifier (e.g., Lenovo Ideapad 81WE00NKUS). The system then determines a resource based on the final identifier (e.g., Dell). In some embodiments, the resource comprises a source. In various embodiments, the source is preconfigured as available, unavailable, or any other appropriate status.

In some embodiments, the identifier is received in the form of a query (e.g., as received from a user). For example, a resource is requested that is associated with an identifier and the system responds with the resource to the requestor.

In some embodiments, the system receives an identifier (e.g., a hardware identifier such as a Macbook Laptop with a 2.3 GHz i9). The system determines that the identifier is associated with a group using a first clustering (e.g., a portable computation device group or a laptop group). The system determines a sub-grouping of the grouping associated with the identifier using a second clustering (e.g., an Apple laptop group or Apple laptop with i9 processors). The system determines a final identifier (e.g., ASIN B08DDB4R6T MVVM2LL/A). The system then determines a resource based on the final identifier (e.g., Microcenter or Staples store). In some embodiments, the resource comprises a source. In various embodiments, the source is preconfigured as available, unavailable, or any other appropriate status.

In various embodiments, the identifier and the final identifier comprise an item or a substitute item. In various embodiments, the resource associated with the final identifier represents an associated channel for acquisition of the item or substitute item.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a hardware processor; and
   a memory coupled with the processor, wherein the memory is configured to provide the processor with instructions which when executed cause the hardware processor to:
   receive an item identifier;
   determine a grouping associated with the item identifier, wherein the grouping is determined using a first clustering, wherein the first clustering is based at least in part on vector distances between vectors generated by pre-processing identifiers in the grouping using a language processing system;
   determine a sub-grouping of the grouping associated with the item identifier, wherein the sub-grouping is determined using a second clustering, wherein the second clustering is based at least in part on string edit distances between the identifiers in the grouping;
   determine, based on the item identifier and the sub-grouping, a source for acquisition of an item; and
   provide the source for acquisition of the item.

2. The system of claim 1, wherein the processor is further configured to:
   determine a substitute item identifier based at least in part on the item identifier and the sub-grouping; and
   provide the substitute item identifier.

3. The system of claim 2, wherein the substitute item identifier is stored.

4. The system of claim 1, wherein the language processing system comprises a transformer system.

5. The system of claim 1, wherein a set of clusters are determined using the language processing system.

6. The system of claim 5, wherein the vectors are generated by pre-processing a pre-determined set of identifiers.

7. The system of claim 1, wherein a substitute item identifier is associated with a sub-group of the grouping.

8. The system of claim 7, wherein the sub-group is associated with the item identifier based at least in part on the string edit distances between the item identifier and members of the sub-group.

9. The system of claim 1, wherein determining the source is based at least in part on a resource timing parameter.

10. The system of claim 1, wherein determining the source is based at least in part on a resource multiplier parameter.

11. The system of claim 1, wherein determining the source is based at least in part on optimizing a function.

12. The system of claim 11, wherein the function comprises a measure of acquiring a given source from a given provider of the source.

13. The system of claim 11, wherein the function comprises a measure involved in acquisition of a given source from a first system associated with a requestor of the source.

14. The system of claim 1, wherein the substitute item identifier is provided to a requestor.

15. The system of claim 1, wherein the substitute item identifier is provided to the source with the substitute item identifier.

16. The system of claim 1, wherein the item identifier is received using a user query.

17. A method, comprising:
   receiving an item identifier;
   determining, using a processor, a grouping associated with the item identifier, wherein the grouping is determined using a first clustering, wherein the first clustering is based at least in part on vector distances between vectors generated by pre-processing identifiers in the grouping using a language processing system;
   determining a sub-grouping of the grouping associated with the item identifier, wherein the sub-grouping is determined using a second clustering, wherein the second clustering is based at least in part on string edit distances between the identifiers in the grouping;
   determining, based on the item identifier and the sub-grouping, a source for acquisition of an item; and
   providing the source for acquisition of the item.

18. A computer program product embodied in a non-transitory computer readable medium and comprising computer instructions for:
   receiving an item identifier;
   determining a grouping associated with the item identifier, wherein the grouping is determined using a first clustering, wherein the first clustering is based at least in part on vector distances between vectors generated by pre-processing identifiers in the grouping using a language processing system;

determining a sub-grouping of the grouping associated with the item identifier, wherein the sub-grouping is determined using a second clustering, wherein the second clustering is based at least in part on string edit distances between the identifiers in the grouping;

determining, based on the item identifier and the sub-grouping, a source for acquisition of an item; and providing the source for acquisition of the item.

* * * * *